Figure 1:
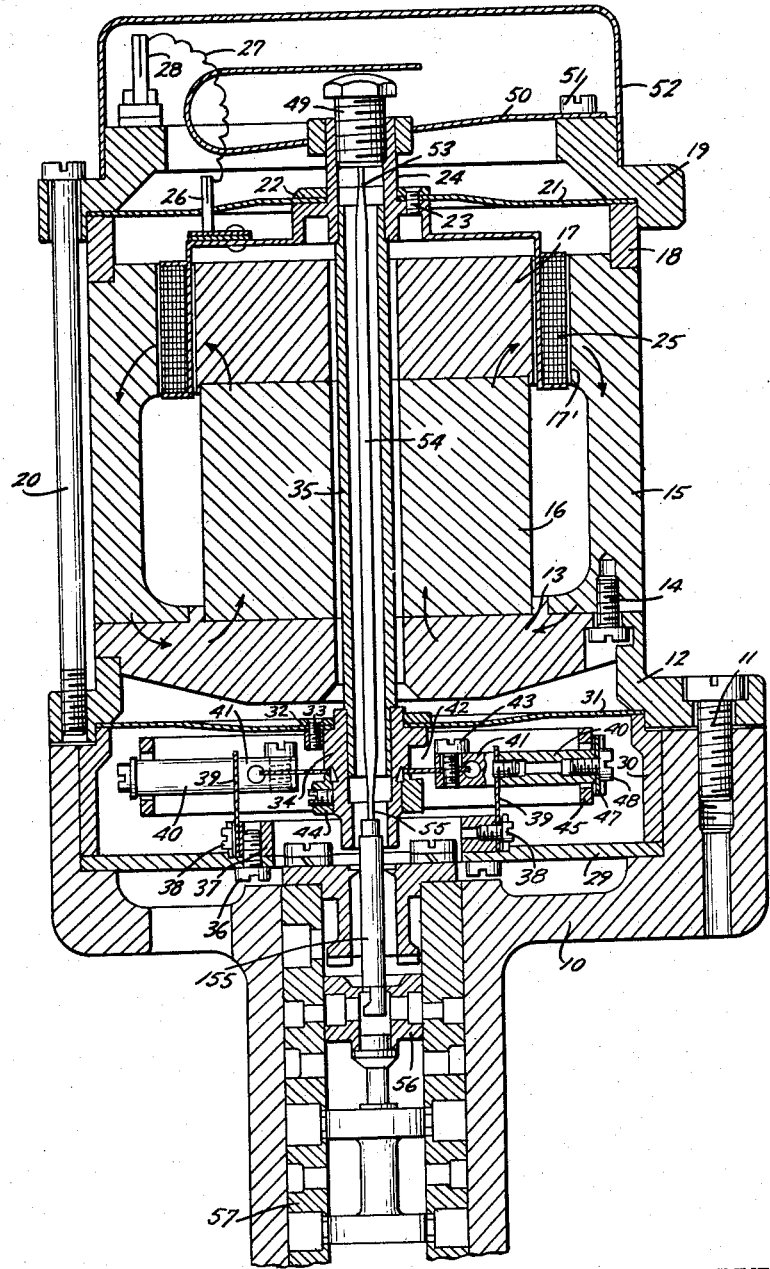

March 3, 1959     J. J. WEBER     2,875,854
ELECTRO-MECHANICAL CONTROL SYSTEM

Filed July 19, 1954     2 Sheets-Sheet 1

INVENTOR.
Josef J. Weber
BY Michael S. Striker
Attorney

March 3, 1959  J. J. WEBER  2,875,854
ELECTRO-MECHANICAL CONTROL SYSTEM
Filed July 19, 1954  2 Sheets-Sheet 2
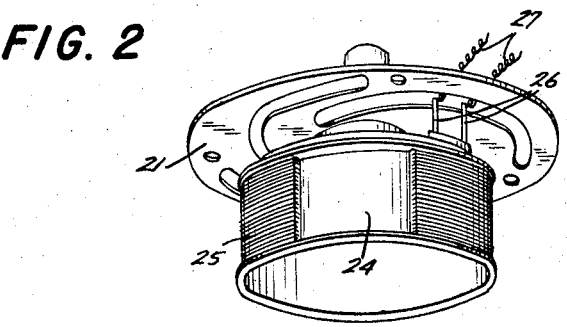
FIG. 2
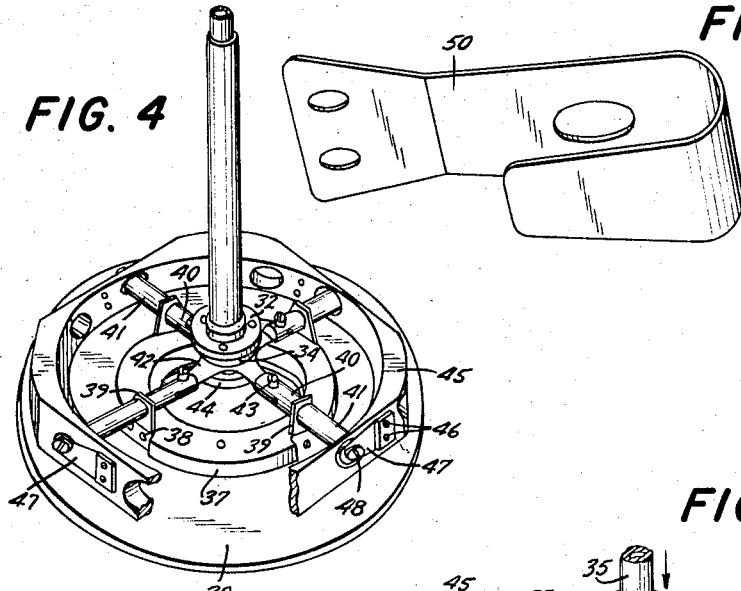
FIG. 3
FIG. 4
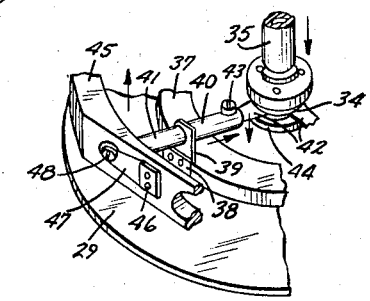
FIG. 5
INVENTOR.
Josef J. Weber
BY Michael S. Striker
Attorney United States Patent Office 2,875,854
Patented Mar. 3, 1959

2,875,854

ELECTRO-MECHANICAL CONTROL SYSTEM

Josef J. Weber, Adliswil, Zurich, Switzerland, assignor to Contraves AG, Zurich, Switzerland Application July 19, 1954, Serial No. 444,293

9 Claims. (Cl. 188—1)

This invention relates to an electro-mechanical control system particularly suited for use in a device which is subjected to acceleration and deceleration.

The invention has the main object of providing a device of the kind referred to which is suitable for being built into a body subject to violent accelerations, for example a remote controlled rocket without the danger that the moveable components of this device may be moved, under the action of changes in the motion of the said body, relative to the fixed components thereof. From another aspect, it is an object of the invention to provide a device of the kind referred to wherein the moveable components perform merely such movements as are determined by the corresponding electric control value which movements due to inertia are prevented.

In particular, the invention is intended to be used for the control mechanism of rockets guided by a guide ray as an electrical signal transforming device for such rockets. Rockets of this type comprise receiving devices and transforming devices for high frequency ray signals which produce two electrical voltages, the variable immediate values of which determine the variable immediate distance of the center of gravity of the rocket from the axis of the signal ray. An improved device of this kind has been described and claimed in the Patent application Ser. No. 411,491, filed on the 19th day of February 1954 by Max E. Lattmann and assigned to Contraves AG of Zurich (Switzerland).

With these and other objects in view, the present invention mainly resides in an electro-mechanical control system for use in a device subjected to acceleration and deceleration, the control system comprising a movable control member and a supporting member supporting the movable control member for reciprocating movement in a predetermined direction; a plurality of double-armed levers extending in radial direction with respect to an axis passing in said predetermined direction through the center of gravity of the movable control member; means for connecting the inner ends of the double arm levers to the movable member; compensating mass means attached to the outer ends of the double armed levers; a plurality of springs extending parallel to said axis, each spring having one end secured to one of the double armed levers and the other end secured to the supporting member, each of said springs being bendable in a radial plane passing through the respective double armed lever so as to operate as the fulcrum of the respective lever for movement of the same in the respective radial plane.

In this manner, turning moments produced on the double armed levers by inertia forces acting on the movable control member and on the compensating mass means during acceleration and deceleration of the device, balance each other and are taken up by the springs without effecting displacement of the movable control member. On the other hand, when electric energy is supplied to the control system for moving the control member in said predetermined direction, the compensating mass means move in directions opposite to the movement of the movable control member, so that the apparatus can be controlled by electric energy while the inertia forces produced during rapid acceleration and deceleration of the device are ineffective.

These and other objects and features of my present invention will be clearly understood from the following description of a preferred embodiment thereof given by way of example with reference to the accompanying drawings, in which:

Fig. 1 is an axial section through the whole device,

Fig. 2 shows a cylindrical coil partly cut open together with a resilient centering disc, in a perspective view from below, Fig. 3 shows in a perspective view on a larger scale a restoring spring for the system, Fig. 4 shows in a perspective view from above the articulation of the compensating mass to the stationary components and to the carrier rod, Fig. 5 is a broken-off part of Fig. 4 illustrating the articulation mechanism.

Referring first to Fig. 1, a ring 12 is fixedly connected by screws 11 to a casing portion 10, in which ring the head plate 13 is mounted which carries the cylindrical casing 15 of a permanent magnet system connected to said head plate by screws 14. Into the said head plate 13 a bored permanent magnet core 16 is pressed, on which a cylindrical pole piece 17 is pressed, which is likewise bored.

Between the cylindrical circumference of the pole piece 17 and a cylindrical inner surface of the cylindrical casing 15 a cylindrical working air gap 17' is left free. The direction of the magnetic flux in the permanent magnet system is indicated in Fig. 1 by arrows. On the cylindrical casing 15 rests a distance ring 18, on which is mounted a holder ring 19, which is connected to the ring 12 by means of screw studs 20. Between the said distance ring 18 and the holder ring 19 resilient circular disc 21 is clamped at its circumference, the center hole of which is clamped on a coil carrier body 24 by means of a clamping ring 22 and of clamping screws 23. The coil carrier body 24 carries a cylindrical coil 25 for the same. The cylindrical coil 25 extends into the cylindrical working air gap 17'. By means of flexible conductors 27 the terminal pins 26 are connected to plugs 28 which are mounted insulated from one another on the holder ring 19.

In the casing portion 10 a plate 29 and an annular casing 30 are inserted, and between the upper end face of this ring and an opposite face of the ring 12 the circumference of a second resilient circular plate 31 is clamped, the central hole of which is clamped to a head piece 34 by the aid of a clamping ring 32 and of clamping screws 33. The coil carrying body 24 centered by the resilient circular plate 21, and the head piece 34 centered by the resilient circular plate 31 carry together a hollow carrier rod 35 which takes part in all axial movements of the cylindrical coil 25. On the plate 29 a ring 37 is attached by means of screws 36 on which by the aid of screws 38 axially directed leaf springs 39 are attached, the ends of which are clamped between the components 40, 41 screwed to one another, of radial stays. From the inner ends of the said radial stays 40, 41, radially extending leaf springs 42 project inwardly which are held in the components 40 by screws 43, and on the head piece 34 by a clamping ring 44. An annular weight compensating mass 45 is attached by screws 46 (Figs. 4 and 5) to tangentially directed leaf springs 47 which are connected by screws 48 to the outer end faces of the components 41 of the said radial stays.

In the upper end of the coil carrier body 24 a plug 49 is screwed, the head of which abuts on a bent restoring leaf spring 50 which is attached on the holder ring 19 by a screw 51. A hood 52 covers the open top end of the holder ring 19. One of the pointed pliable ends, 53, of rod 54, which extends within the hollow carrier rod in the axis of the system, abuts on plug 49 and its second end 55, likewise pointed and pliable, acts according to Fig. 1 through an intermediate rod 155 on the piston 56 of a pneumatic control valve 57 which is built into the casing portion 10. The movements of the piston 56 are intended to be determined solely and exclusively by the control current which is supplied to the coil 25 through the terminals 28. Members 35, 54, 155, 56, 24, 34 and 25 constitute a movable control member.

As indicated above, an electrical voltage is obtained in the rocket with which the present invention may be associated. This electrical voltage produces a current, preferably a D. C. current, which flows through the winding 25 illustrated in Figs. 1 and 2. The flow of current through the winding 25 produces a magnetic flux distribution which interacts with the magnetic flux distribution produced by the permanent magnetic core 16.

Accordingly, the movable magnet winding 25 and the entire movable control member, assumes a position which is due to the resultant forces of the two interacting magnetic fluxes. The magnet winding 25 can only perform a straight movement in axial direction of the hollow carrier rod 35. The movement of the magnet winding 25 is transmitted to the rod 54 which is located axially of the hollow carrier rod 35. This changes the position of piston 56 of the pneumatic control valve 57 through intermediate rod 155.

Any change in the position of the magnet winding and of the entire movable control member from its normal rest position will produce a corresponding change in the position of the compensating mass 45, as best seen in Fig. 4. As the rod 35 is moved downwards, for example, the connecting radial leaf springs 42 will also be moved in the downward direction. A double-armed lever means is formed by connecting members 40 and 41, and has the center thereof maintained in a substantially fixed position by the supporting axial leaf spring means 39. Therefore, while the connecting radial leaf springs 42 move in the downward direction with the inner ends of members 41, the outer ends of the double-armed lever means, which support the compensating mass 45, move in upward direction with the supporting axial leaf springs 39 serving as fulcrums for the double-armed levers 40, 41 and being resiliently bent.

Therefore, barring any externally applied forces, not only the position of the winding 25, but also the position of the compensating mass will be determined by the amount of current flowing through the magnet winding 25. In the event that the amount of current flowing through the magnet winding 25 is changed, its position will be changed in the axial direction thereof an amount proportional to the amount and the direction of the current flowing through the winding thereof. This, of course, will produce a corresponding change in the position of the compensating mass 45 in the opposite axial direction.

In the event of any external accelerating, decelerating or vibrational force being applied to the apparatus in which the present invention is located, such as a rocket, the movable control member including magnet winding 25 will tend to move in an axial direction corresponding to the direction of the applied force. However, the compensating mass 45 which is subjected to exactly the same external force will tend to move in the same direction as the magnet winding 25. It is apparent that the tendencies of both the magnet winding 25 and the compensating mass 45 to move in the same axial direction will exactly cancel each other due to the fact that the forces act on opposite ends of the double-armed levers 40, 41 and the positions of both the magnet winding 25 and the compensating mass 45 will correspond to the amount of current flowing in the magnet winding 25.

In this manner the effect of any externally or internally applied forces will be cancelled out and the position of the magnet winding and its associated carrier rod piston 56 of the pneumatic control valve 57 will be determined solely by the current flowing through the magnet winding. The device described does not permit any radial movements of the movable components, and by suitably dimensioning the compensating mass, the whole system can be balanced in respect of axial decelerations and accelerations. Since all articulations are formed by leaf springs stressed in bending and otherwise fixedly clamped, no friction losses are caused by the articulations. The inertia forces act in longitudinal direction of leaf springs 39 so that pivotal movements of levers 40, 41 are not influenced. The resiliency of the centering resilient discs 21 and 31 is increased by arcuate cutouts shown in Fig. 2.

From the above description it will become apparent that members 10, 16, 13, 15, 18, 19, 29, 30 and 37 constitute a supporting member for the movable control members 25, 35, 54, 155, 56, 24 and 34.

While I have herein described, and illustrated in the accompanying drawing what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. In a device subjected to acceleration and deceleration, in combination, an electro-mechanical control system including a movable control member and a supporting member supporting said movable control member for reciprocating movement in a predetermined straight direction, said movable control member being adapted to move when electric energy is supplied to said electro-mechanical control system; a plurality of circumferentially spaced double-armed levers extending in radial direction with respect to an axis passing in said predetermined direction through the center of gravity of said movable control member; means for connecting the inner ends of said double-armed levers to said movable control member so that said inner ends move with said control member; compensating mass means attached to the outer ends of said double-armed levers; and a plurality of leaf springs extending parallel to said axis in said predetermined straight direction, each leaf spring having one end secured to one of said double-armed levers spaced from said ends of the same, and the other end secured to said supporting member, each of said leaf springs being located in a plane normal to the radial direction of the respective associated double-armed lever and being bendable in a radial plane passing through the respective double-armed lever so as to operate as the fulcrum of the respective double-armed lever for movement of the same in the respective radial plane whereby turning moments produced on said double-armed levers by inertia forces acting on said movable control member and said compensating mass means during acceleration and deceleration of the device in said direction balance each other and are taken up by said leaf springs without effecting displacement of said movable control member, while said movable control member and said compensating mass means move in opposite directions when electric energy is supplied to said electro-mechanical control system.

2. In a device subjected to acceleration and deceleration, in combination, an electro-mechanical control system including a movable control member and a supporting member supporting said movable control member for reciprocating movement in a predetermined straight direction, said movable control member being adapted to move when electric energy is supplied to said electro-mechanical control system; a plurality of circumferentially spaced double-armed levers extending in radial direction with respect to an axis passing in said predetermined direction through the center of gravity of said movable control member; a plurality of radial leaf springs extending in radial directions in a plane perpendicular to said axis, each of said radial leaf springs having an inner end secured to said movable control member, and an outer end secured to the inner end of one of said double-armed levers; compensating mass means attached to the outer ends of said double-armed levers; and a plurality of axial leaf springs extending parallel to said axis in said predetermined straight direction, each axial leaf spring having one end secured to one of said double-armed levers spaced from said ends of the same, and the other end secured to said supporting member, each of said axial leaf springs being located in a plane normal to the radial direction of the respective associated double-armed lever and being bendable in a radial plane passing through the respective double-armed lever so as to operate as the fulcrum of the respective double-armed lever for pivotal movement of the same in the respective radial plane whereby turning moments produced on said double-armed levers by inertia forces acting on said movable control member and said compensating mass means during acceleration and deceleration of the device in said direction balance each other and are taken up by said axial leaf springs without effecting displacement of said movable control member, while said movable control member and said compensating mass means move in opposite directions when electric energy is supplied to said electro-mechanical control system.

3. In a device subjected to acceleration and deceleration, in combination, an electro-mechanical control system including a movable control member and a supporting member supporting said movable control member for reciprocating movement in a predetermined straight direction, said movable control member being adapted to move when electric energy is supplied to said electro-mechanical control system; a plurality of circumferentially spaced double-armed levers extending in radial direction with respect to an axis passing in said predetermined direction through the center of gravity of said movable control member; means for pivotally connecting the inner ends of said double-armed levers to said movable member; an annular compensating mass means extending about said axis in the region of the outer ends of said double-armed levers; a plurality of tangential leaf springs extending in tangential direction with respect to said axis and to said annular compensating mass means and in a plane perpendicular to one of said double-armed levers, each of said tangential leaf springs having one end secured to the outer end of the respective associated double-armed lever, and the other end secured to said compensating mass means so as to permit movements of said compensating mass means in a direction transverse to said axis; and a plurality of leaf springs extending parallel to said axis in said predetermined straight direction, each leaf spring having one end secured to one of said double-armed levers spaced from said ends of the same, and the other end secured to said supporting member, each of said leaf springs being located in a plane normal to the radial direction of the respective associated double-armed lever and being bendable in a radial plane passing through the respective double-armed lever so as to operate as the fulcrum of the respective double-armed lever for pivotal movement of the same in the respective radial plane whereby turning moments produced on said double-armed levers by inertia forces acting on said movable control member and said compensating mass means during acceleration and deceleration of the device in said direction balance each other and are taken up by said leaf springs without effecting displacement of said movable control member, while said movable control member and said compensating mass means move in opposite directions when electric energy is supplied to said electro-mechanical control system.

4. In a device subjected to acceleration and deceleration, in combination, an electro-mechanical control system including a movable control member and a supporting member supporting said movable control member for reciprocating movement in a predetermined straight direction, said movable control member being adapted to move when electric energy is supplied to said electro-mechanical control system; a plurality of circumferentially spaced double-armed levers extending in radial direction with respect to an axis passing in said predetermined direction through the center of gravity of said movable control member; a plurality of radial leaf springs extending in radial directions in a plane perpendicular to said axis, each of said radial leaf springs having an inner end secured to said movable control member, and an outer end secured to the inner end of one of said double-armed levers; an annular compensating mass means extending about said axis in the region of the outer ends of said double-armed levers; a plurality of tangential leaf springs extending in tangential direction with respect to said axis and to said annular compensating mass means and in a plane perpendicular to one of said double-armed levers, each of said tangential leaf springs having one end secured to the outer end of the respective associated double-armed lever, and the other end secured to said compensating mass means so as to permit movements of said compensating mass means in a direction transverse to said axis; and a plurality of axial leaf springs extending parallel to said axis in said direction, each axial leaf spring having one end secured to one of said double-armed levers spaced from said ends of the same, and the other end secured to said supporting member, each of said axial leaf springs being located in a plane normal to the radial direction of the respective associated double-armed lever and being bendable in a radial plane passing through the respective double-armed lever so as to operate as the fulcrum of the respective double-armed lever for pivotal movement of the same in the respective radial plane whereby turning moments produced on said double-armed levers by inertia forces acting on said movable control member and said compensating mass means during acceleration and deceleration of the device in said direction balance each other and are taken up by said axial leaf springs without effecting displacement of said movable control member, while said movable control member and said compensating mass means move in opposite directions when electric energy is supplied to said electro-mechanical control system.

5. In a device subjected to acceleration and deceleration, in combination, an electro-mechanical control system including a supporting member, a movable control member including a winding and an elongated member secured to said winding and having a longitudinal axis passing through the center of gravity of said movable control member, and a pair of resilient discs having outer peripheral portions secured to said supporting member and center portions secured to said elongated member at spaced points thereof, said resilient discs supporting said movable control member for straight reciprocating movement in the direction of said axis of said elongated member, said movable control member being adapted to move when electric energy is supplied to said winding; spring means secured to said supporting member and engaging said control member for returning the same to a normal position; a plurality of circumferentially spaced double-armed levers extending in radial direction with respect to said axis of said elongated member; means for pivotally connecting the inner ends of said double-armed levers to said movable member; compensating mass means attached to the outer ends of said double-armed levers; and a plurality of leaf springs extending parallel to said axis in said direction, each leaf spring having one end secured to one of said double-armed levers spaced from said ends of the same, and the other end secured to said supporting member, each of said leaf springs being located in a plane normal to the radial direction of the respective associated double-armed lever and being bendable in a radial plane passing through the respective double-armed lever so as to operate as the fulcrum of the respective double-armed lever for pivotal movement of the same in the respective radial plane whereby turning moments produced on said double-armed levers by inertia forces acting on said movable control member and said compensating mass means during acceleration and deceleration of the device in said direction balance each other and are taken up by said leaf springs without effecting displacement of said movable control member, while said movable control member and said compensating mass means move in opposite directions when electric energy is supplied to said winding.

6. In a device subjected to acceleration and deceleration, in combination, an electro-mechanical control system including a supporting member, a movable control member including a winding and an elongated member secured to said winding and having a longitudinal axis passing through the center of gravity of said movable control member, and a pair of resilient discs having outer peripheral portions secured to said supporting member and center portions secured to said elongated member at spaced points thereof, said resilient disc supporting said movable control member for straight reciprocating movement in a direction of said axis of said elongated member, said movable control member being adapted to move when electric energy is supplied to said winding; spring means secured to said supporting member and engaging said control member for returning the same to a normal position; a plurality of circumferentially spaced double-armed levers extending in radial direction with respect to said axis of said elongated member; a plurality of radial leaf springs extending in radial directions in a plane perpendicular to said axis, each of said radial leaf springs having an inner end secured to said elongated member, and an outer end secured to the inner end of one of said double-armed levers; an annular compensating mass means extending about said axis in the region of the outer ends of said double-armed levers; a plurality of tangential leaf springs extending in tangential direction with respect to said axis and to said annular compensating mass means and in a plane perpendicular to one of said double-armed levers, each of said tangential leaf springs having one end secured to the outer end of the respective associated double-armed lever, and the other end secured to said compensating mass means so as to permit movements of said compensating mass means in a direction transverse to said axis; and a plurality of axial leaf springs extending parallel to said axis in said direction, each axial leaf spring having one end secured to one of said double-armed levers spaced from said ends of the same, and the other end secured to said supporting member, each of said axial leaf springs being located in a plane normal to the radial direction of the respective associated double-armed lever and being bendable in a radial plane passing through the respective double-armed lever so as to operate as the fulcrum of the respective double-armed lever for pivotal movement of the same in the respective radial plane whereby turning moments produced on said double-armed levers by inertia forces acting on said movable control member and said compensating mass means during acceleration and deceleration of the device in said direction balance each other and are taken up by said axial leaf springs without effecting displacement of said movable control member, while said movable control member and said compensating mass means move in opposite directions when electric energy is supplied to said winding.

7. A device as set forth in claim 6 wherein each of said double-armed levers includes a first arm portion having a threaded pin and a second arm portion having an inner thread engaged by said threaded pin, and wherein each of said axial leaf springs has said one end thereof formed with a hole through which said threaded pin passes so that said one end of each axial leaf spring is clamped between said first and second arm portions of the respective double-armed lever.

8. A device as set forth in claim 7 wherein each of said axial leaf springs has the other end thereof formed with a bore, and including a plurality of screws respectively passing through said bores and attaching said axial leaf springs to said support.

9. A device as set forth in claim 6 wherein said compensating mass is formed with a plurality of bores, the outer end of each of said double-armed levers passing through one of said bores and being movable in the same, and wherein each of said tangential leaf springs is located outside of said annular compensating mass means and secured to the outer surface thereof.

References Cited in the file of this patent

UNITED STATES PATENTS

| | | |
|---|---|---|
| 1,973,510 | Schieferstein | Sept. 11, 1934 |
| 2,034,909 | Kollsman | Mar. 24, 1936 |
| 2,155,052 | Byland | Apr. 18, 1939 |
| 2,623,083 | Schlumberger | Dec. 23, 1952 |

FOREIGN PATENTS

| | | |
|---|---|---|
| 174,750 | Austria | Apr. 25, 1953 |